US 6,757,377 B1

(12) United States Patent
Bingel et al.

(10) Patent No.: US 6,757,377 B1
(45) Date of Patent: Jun. 29, 2004

(54) CENTRAL OFFICE FILTER SYSTEM AND METHOD

(75) Inventors: Thomas J. Bingel, Belleair Beach, FL (US); Ramon B. Hazen, N. Redington Beach, FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/318,279

(22) Filed: May 25, 1999

Related U.S. Application Data
(60) Provisional application No. 60/114,132, filed on Dec. 30, 1998.

(51) Int. Cl.[7] .............................................. H04M 11/06
(52) U.S. Cl. ............................ 379/373.01; 379/142.04; 379/93.01
(58) Field of Search ........................ 379/93.01, 93.09, 379/142.04, 373.01, 373.05

(56) References Cited

U.S. PATENT DOCUMENTS

| | | | | |
|---|---|---|---|---|
| 4,355,303 A | * | 10/1982 | Phillips et al. ......... 340/310.02 |
| 4,588,861 A | * | 5/1986 | Teich ........................ 379/159 |
| 5,426,698 A | * | 6/1995 | Reymond .............. 379/399.01 |
| 5,526,406 A | * | 6/1996 | Luneau ..................... 379/88.2 |
| 5,627,501 A | | 5/1997 | Biran et al. ................. 333/17.1 |
| 5,848,150 A | * | 12/1998 | Bingel .................... 379/399.01 |
| 6,144,735 A | * | 11/2000 | Bella ...................... 379/399.01 |
| 6,219,411 B1 | * | 4/2001 | Peters et al. ................. 379/177 |
| 6,477,249 B1 | * | 11/2002 | Williamson et al. ... 379/399.01 |

* cited by examiner

Primary Examiner—Minsun Oh Harvey
Assistant Examiner—Daniel Swerdlow
(74) Attorney, Agent, or Firm—Thomas, Kayden, Horstemeyer & Risley LLP

(57) ABSTRACT

A central office (CO) filter system connects between a CO telephone switch and a telephone connection (subscriber loop) that can communicate voice and digital data channels. The CO filter system suppresses transients and harmonics on the connection caused by a telephone ring signal (typically, 90 to 150 Vrms at 15 to 68 Hz) generated by the switch in order to minimize adverse effects on the digital data channel on the connection. Architecturally, the CO filter system includes a first filter designed to implement a first low pass filter function to attenuate frequencies higher than a ring signal so that transients and harmonics produced from the ring signal are suppressed, a second filter designed to implement a second low pass filter function to attenuate frequencies higher than a voice channel, and a current detector designed to detect when a telephone is off-hook. The current detector implements the first filter when the telephone is on-hook, particularly, when the ring signal occurs, and implements the second filter when the telephone is off-hook.

15 Claims, 5 Drawing Sheets

CENTRAL OFFICE FILTER SYSTEM AND METHOD

CROSS-REFERENCE TO RELATED APPLICATIONS

This document claims priority to and the benefit of the filing date of co-pending commonly assigned Provisional Application entitled, "TELEPHONY CENTRAL OFFICE FILTER WITH IMPROVED POWER RING TRANSIENT SUPPRESSION FOR SIMULTANEOUS DIGITAL SUBSCRIBER LOOP DATA COMMUNICATIONS AND POTS," filed Dec. 30, 1998, and accorded Ser. No. 60/114,132. The foregoing pending provisional application is hereby incorporated herein by reference in its entirety.

FIELD OF THE INVENTION

The present invention relates generally to the arts of data communications and telephony, and more particularly, to a central office (CO) filter system (and associated methodology) for connection between a CO telephone switch and a telephone connection (e.g., subscriber loop) that can communicate voice and digital data signals, for the purpose of suppressing transients and harmonics on the connection caused by a telephone ring signal generated by the switch. The suppression advantageously minimizes adverse effects on the digital data channel on the connection, particularly voice signals that are communicated along the one or more digital data channels.

BACKGROUND OF THE INVENTION

Recently, in the art of telephony, 2-wire copper telephone connections, particularly, those that make up subscriber loops between a telephone central office (CO) and customer premises (CP), have been utilized for concurrently communicating more than one signal, including digital data, digital voice, and analog voice (i.e., plain old telephone service (POTS)) signals. For example, a high speed digital subscriber line (DSL) channel (e.g., ADSL, SDSL, RADSL, VADSL, etc.) and an analog plain old telephone system (POTS) channel can be established concurrently over a single physical 2-wire connection. The signals are typically separated in frequency. The POTS channel usually exhibits a frequency spectrum of about 0 KHz to about 4 KHz, whereas the DSL channel exhibits a frequency spectrum of about 20 KHz to about 500 KHz with a bit rate of about 1.5 Mbits/sec to 52 Mbits/sec.

A new DSL technology known as "MVL™," or "multiple virtual lines," which has recently been created by and is commercially available from Paradyne Corporation, U.S.A., an innovator in DSL technology, enables simultaneous transmission of digital data and analog voice signals over a single 2-wire pair connection. This technology is described in commonly assigned application entitled, "APPARATUS AND METHOD FOR COMMUNICATING VOICE AND DATA BETWEEN A CUSTOMER PREMISES AND A CENTRAL OFFICE," filed Nov. 3, 1997, and accorded U.S. patent application Ser. No. 08/862,796.

Another new DSL technology known as "Tripleplay™," which has also recently been created by and is commercially available from Paradyne Corporation, U.S.A., permits simultaneous communication of a digital data signal, an analog voice signal, and up to two digital voice signals, over a single 2-wire pair connection.

When multiple channels are communicated across a connection, historically, a POTS splitter has been utilized to decouple the channels. A POTS splitter is typically situated at the CO as well as at the CP. A POTS splitter is typically a passive or active one-to-three port device. It often includes a low pass filter to minimize high frequency transients produced by on-hook/off-hook transitions of telephone equipment, so as to prevent tainting or slowing of the high speed data on the DSL channel(s). Also, it is usually configured to provide a high impedance to the telephone line in the DSL frequency band in order to prevent DSL power from being imparted on the POTS communications device that is connected to the line.

The specification of POTS splitters has been the subject of several industry standards bodies. For example, see American National Standards Institute, ANSI T1.413–1995, Sections 8 and 10, regarding ADSL/POTS splitters. Moreover, as an example of a possible implementation of a POTS splitter, see J. Cook, P. Sheppard, "ADSL and VADSL Splitter Design and Telephony Performance," *IEEE Journal on Selected Areas in Communications*, December 1995.

Although transmission of both digital data and analog voice signals along a subscriber loop between a telephone switch at a CO and a CP is possible, it is not free of problems. A significant problem arises when the telephone switch initiates a ring signal along the subscriber loop. The ring signal is a high amplitude periodic wave form that is communicated for two second intervals, with each ring separated by four second time periods. The ring signal is specified in FCC Part 68. Generally, the ring signal is an alternating current (AC) signal having a root-mean-squared (rms) voltage of up to about 150 volts. The ring signal was designed to be very large in order to properly actuate electromechancial ringers that were present in earlier versions of telephones. Unfortunately, the application of the baseband ringing current imposes undesirable noise upon the one or more other digital data channels on the subscriber loop, particularly the digital voice channel(s), for example, that provided in Paradyne's Tripleplay technology, in the form of transients and harmonics. For adequate performance, the digital voice channel(s) need to experience low bit errors.

Thus, a heretofore unaddressed need exists in the industry for a way to prevent or substantially minimize the adverse effects of a ring signal upon the one or more digital data channels that are communicated along the subscriber loop with the analog voice channel.

SUMMARY OF THE INVENTION

The present invention provides a central office (CO) filter system (and associated methodology) for connection between a CO telephone switch and a telephone connection (e.g., subscriber loop) that can communicate voice and digital data signals, for the purpose of suppressing transients and harmonics on the connection caused by a telephone ring signal generated by the telephone switch. The suppression advantageously minimizes adverse affects on the digital data channel on the connection, particularly voice signals that are communicated along the one or more digital data channels between the CO and customer premises (CP).

In architecture, the CO filter system includes a first filter designed to implement a first low pass filter function to attenuate frequencies higher than a ring signal so that transients and harmonics produced from the ring signal are suppressed, a second filter designed to implement a second low pass filter function to attenuate frequencies higher than a voice channel, and a current detector designed to detect when a telephone is off-hook. The current detector implements the first filter when the telephone is on-hook, particularly, when the ring signal occurs, and implements the second filter when the telephone is off-hook.

In another sense, the present invention may be viewed as providing a method for suppressing transients and harmonics on a telephone connection that communicates analog and digital data channels and that is caused by a telephone ring signal generated by a telephone switch in order to minimize adverse effects on a digital data channel on the connection. In this regard, the method can be broadly viewed as comprising the following steps: (a) implementing a first transfer function during a ring signal, the ring signal occurring when a telephone connected to said telephone connection is on-hook, the first transfer function configured to attenuate frequencies higher than said ring signal in order to suppress transients and harmonics produced by the ring signal; and (b) implementing a second transfer function when the telephone is off-hook, the second transfer function configured to permit passage of an analog voice channel, while attenuating frequencies higher than the analog voice channel.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Figure 1:
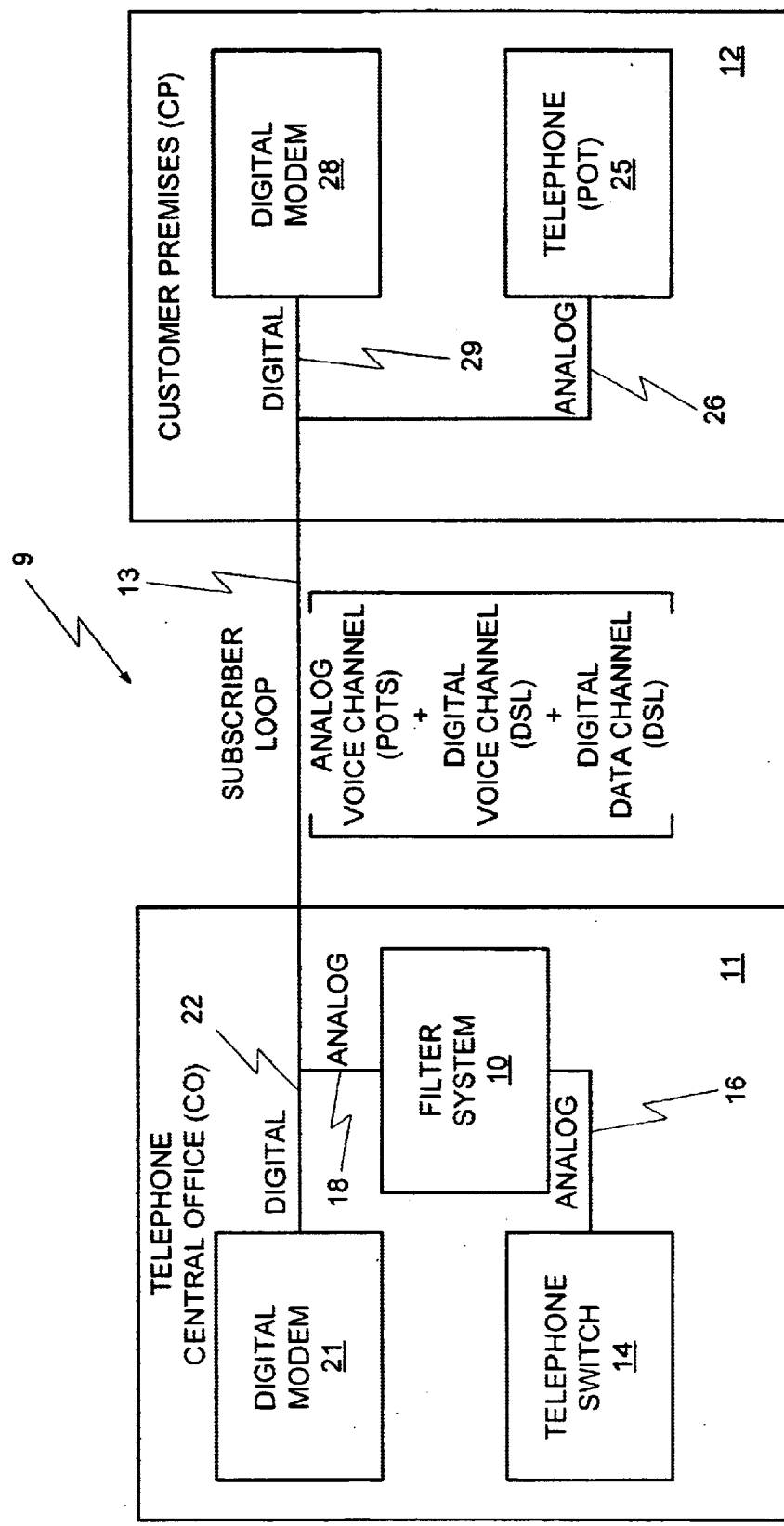
FIG. 1 is a block diagram of a telephone system arrangement showing the CO filter system of the invention connected between a CO telephone switch and a subscriber loop at a CO.

FIG. 1 is a block diagram illustrating a telephone system arrangement 9 that employs the central office (CO) filter system 10 and associated methodology in accordance with the present invention. Generally, in architecture, the telephone system arrangement 9 includes a CO 11 in communication with a customer premises (CP) 12 via a subscriber loop 13, which is essentially any suitable connection for passing electrical signals, but is typically a copper two-wire pair, as is well known in the art, that was originally designed to carry a 0–4 KHz analog voice channel.

In the context of this document, "central office" or "CO" means any site having a telephone switch 14 associated with the public switched telephone network (PSTN), as shown in FIG. 1, or any site where a subscriber loop connects to the telephone switch 14. The telephone switch 14 is well known in the art and an example is a model 5ESS manufactured by and commercially available from Lucent Technologies, Inc., U.S.A. The telephone switch 14 establishes and maintains an analog voice channel on the subscriber loop 13 by way of the CO filter system 10, as indicated by two-wire connections 16, 18 in FIG. 1. A digital modem 21 maintains one or more data channels, sometimes referred to as digital subscriber line (DSL) channels, on the subscriber loop 13 via a two-wire connection 22. In the preferred embodiment, the digital modem 21 maintains and communicates along a digital data channel and one or more digital voice channels on the subscriber loop 13. Digital modems and DSL technologies (e.g., ADSL, SDSL, RADSL, VADSL, etc.) are well known in the art and are the subject of various industry standards. The preferred embodiment of the digital modem 21 is one that implements Paradyne's MVL™ technology and is described in commonly assigned copending application entitled, "APPARATUS AND METHOD FOR COMMUNICATING VOICE AND DATA BETWEEN A CUSTOMER PREMISES AND A CENTRAL OFFICE," filed Nov. 3, 1997, and accorded Ser. No. 08/862,796. The foregoing copending application is incorporated herein by reference in its entirety. It should be specifically emphasized that this example of an embodiment is intended to be non-limiting and that the CO filter system 10 of the invention can be used in connection with any type of digital modem and in connection with any telephone arrangement 9 having a subscriber loop 13 carrying both an analog voice channel (i.e., POTS) and a digital data channel, for example but not limited to, channels in accordance with ADSL, SDSL, RADSL, VADSL, etc.

The CP 12 includes a telephone (or POT) 25 designed to communicate along the two-wire connection 26 and subscriber loop 13. The telephone 25 communicates along an analog voice channel with the telephone switch 14 and, notably, is designed to receive a telephone ring from the telephone switch 14. A digital modem 28 of any suitable design is also connected to the subscriber loop 13 at the CP 12, as indicated by two-wire connection 29, and can be involved in communicating along one or more digital data channels established along the subscriber loop 13 with the digital modem 21 at the CO 11. In the preferred embodiment, the digital modem 28 implements Paradyne's MVL™ technology, as set forth in application Ser. No. 08/862,796.

In operation, either the telephone 25 or the telephone switch 14 can initiate an analog telephone call. When the telephone 25 initiates a call, the transmitter/receiver is transitioned from on-hook to off-hook status, which transition is detected by the telephone switch 14, and a telephone connection ensues. When the telephone switch 14 initiates a call, the telephone switch 14 communicates a ring signal along connection 16, through the CO filter system 10, and through connections 18, 13, 26 to the telephone 25 at the CP 12. The ring signal is a high amplitude periodic waveform that is typically communicated for two second intervals, with four second time periods therebetween. Generally, the ring signal is an alternating current (AC) signal having an rms voltage up to about 150 volts with a direct current (DC) offset of around 50 volts. The ring signal was designed to be very large in order to properly actuate electromechanical ringers that were present in earlier versions of telephones.

Moreover, this ring signal can occur at any time, and application of the ring signal by the telephone switch 14 to line 16 can occur asynchronously (i.e., not at zero crossing). Of particular concern, the ring signal can occur while a digital data bit stream is communicated between digital modems 21, 28, along the subscriber loop 13, undesirably causing errors to occur in the digital data that is transferred unless some action is taken as prescribed by the present invention. The CO filter system 10 of the invention suppresses transients and harmonics that can result from the ring signal from the telephone switch 14 to thereby minimize any adverse affects upon digital data channels maintained along the subscriber loop 13. The architecture, functionality, and operation of the CO filter system 10 will be described hereinafter with reference to the remaining figures.

Figure 2:
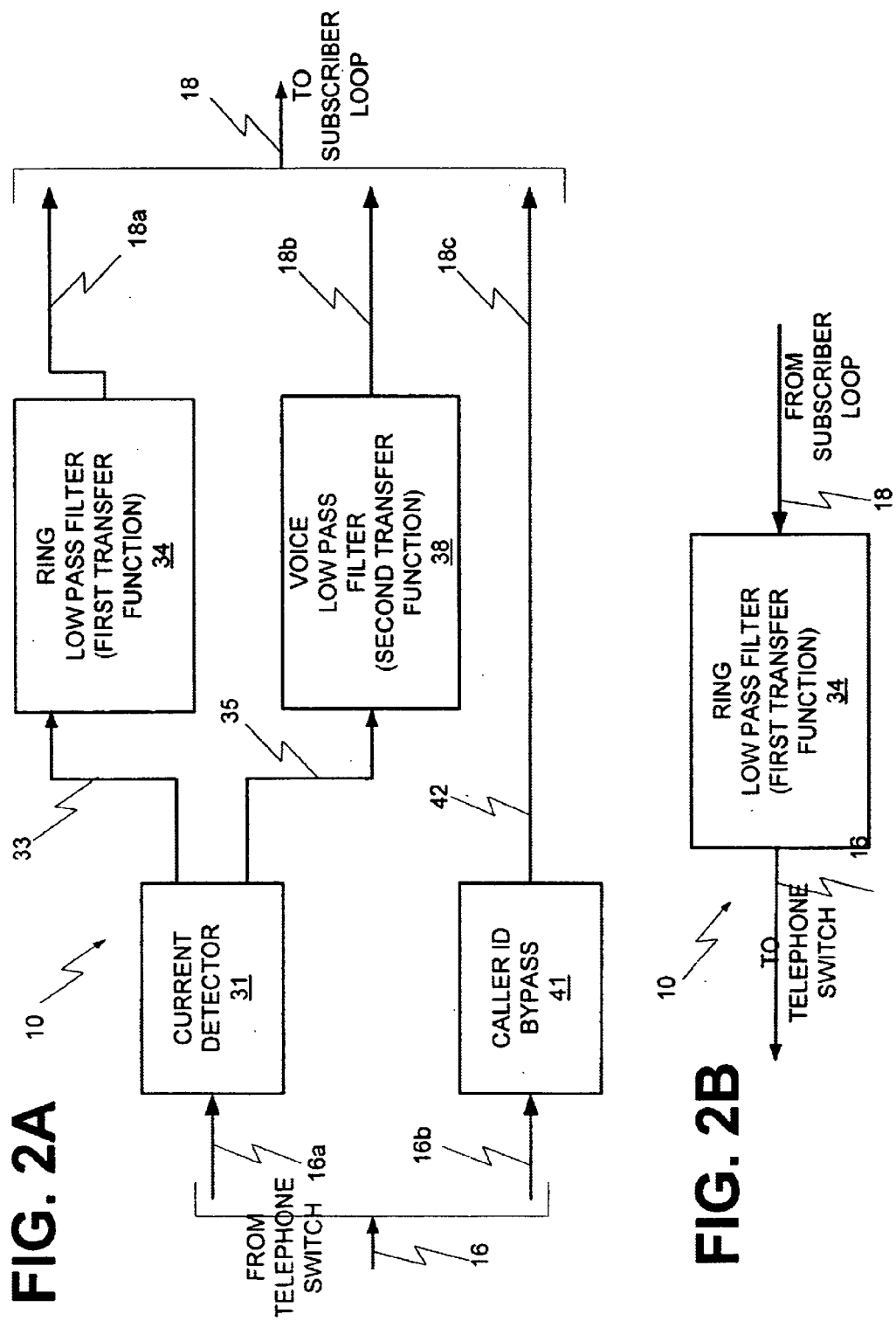
FIG. 2A is a functional block diagram of the CO filter system of FIG. 1 in relation to a signal communicated from the telephone switch to the subscriber loop.
FIG. 2B is a functional block diagram of the CO filter system of FIG. 1 in relation to a signal communicated from the subscriber loop to the telephone switch.

FIG. 2A is a functional block diagram illustrating the CO filter system 10 (FIG. 1) with respect to signals communicated from connection 16 to connection 18. Generally, the CO filter system 10 includes a current detector 31, a ring low-pass filter (LPF) 34, a voice LPF 38, and a caller identification (ID) bypass 41, in cooperation functionally, as shown in FIG. 2. The current detector 31 detects DC current on the connection 16 (see FIG. 1; corresponds to pair of wires 16a, 16b in FIG. 2A) and is designed to switch between the ring LPF 34 and the voice LPF 38, based upon the degree of DC current on the connection 16. When there is a ring signal, the telephone 25 (FIG. 1) is on-hook at the time, and the current detector 31 is designed to communicate the ring signal, typically measuring 90–150 volts rms at 15–68 hertz (Hz) and having a DC offset but low DC current, to the ring LPF 34, as indicated by reference arrow 33. In turn, the ring LPF 34 imposes a first transfer function (also known as, transfer characteristic, or signal response) upon the power ring signal in order to suppress transients and harmonics associated therewith. The ring LPF 34 passes the filter signal on to the subscriber loop 13 by way of connection 18 (FIG. 1) and ultimately to the CP 12 (FIG. 1).

When the current detector 31 detects a significant DC current on the subscriber loop 13, then the current detector 31 assumes that the telephone 25 (FIG. 1) is off hook, and therefore, the current detector 31 passes any signal from the subscriber loop 13 through the voice LPF 38, which imposes a second transfer function upon the signals communicated between connections 16, 18. The second transfer function is different from the first transfer function in that the second transfer function has a higher cutoff frequency than the first transfer function and is more suitable for passing the voice band of 0–4 KHz. The second transfer function is designed to reduce DSL signal imparted on the CO line card to reduce power overload and distortion products while passing DC to 4 KHz. The voice LPF 38 can be any conventional or custom filter directed to passing the voice band.

The caller identification (ID) bypass 41 is designed to permit passage of the caller ID signal that may be communicated along the subscriber loop 13. The caller ID signal occurs between the first and second rings, in accordance with the applicable telephony standards. The caller ID signal is typically modulated via frequency shift keying (FSK). The caller ID bypass 41 is designed to permit communication of the caller ID signal through the CO filter system 10, generally unattenuated or not severely attenuated, from connection 16 to 18.

FIG. 2B is a functional block diagram illustrating the CO filter system 10 (FIG. 1) with respect to signals communicated from connection 18 to connection 16, i.e., from the subscriber loop 13 to the telephone switch 14. Generally, the CO filter system 10 imposes the voice LPF 34, and hence, the first transfer function, upon the signals, which are basically analog voice signals, communicated from connection 18 to 16.

First Embodiment

Figure 3:
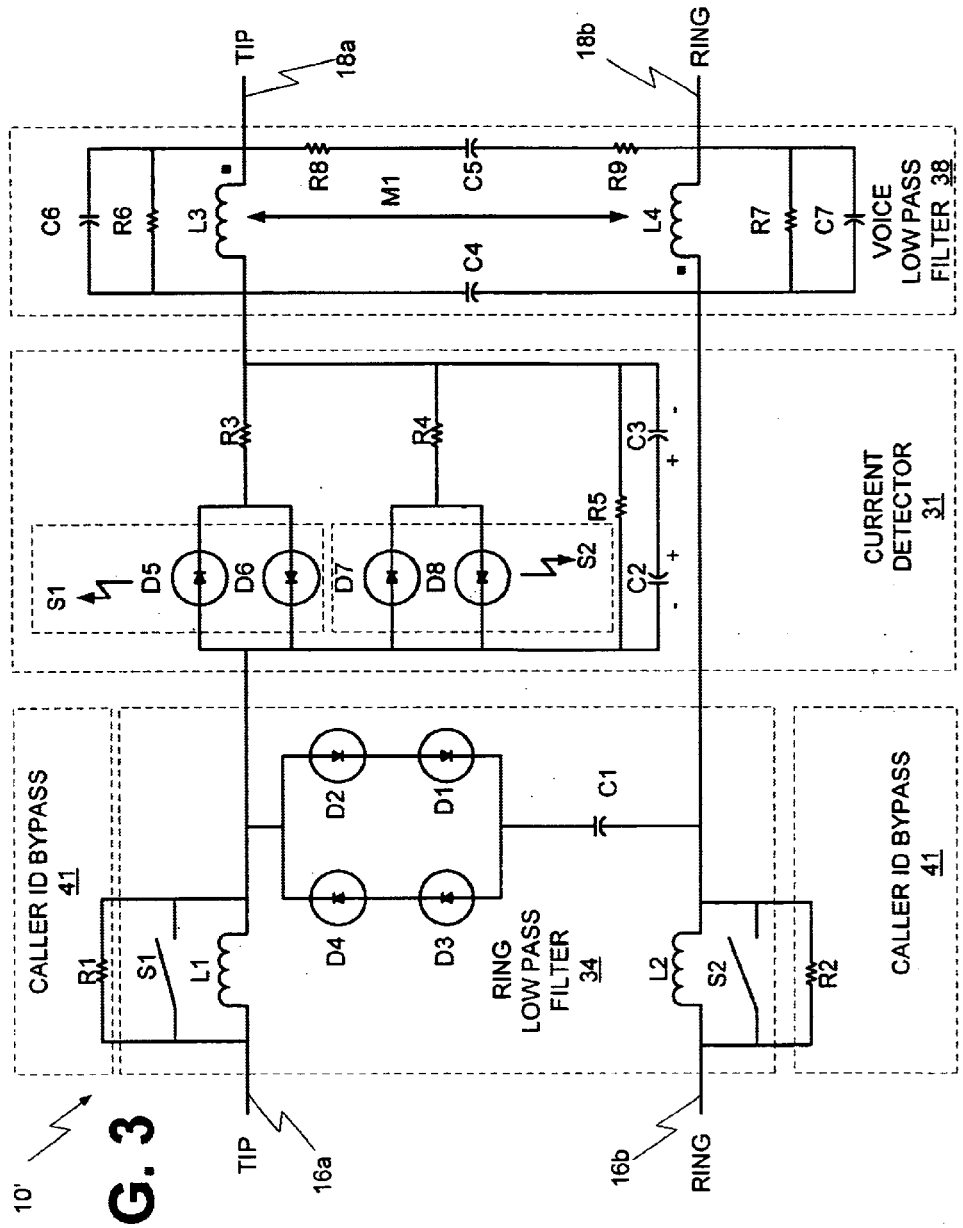
FIG. 3 is a first embodiment (best mode) of the CO filter system of FIGS. 1 and 2.

A first embodiment of a possible implementation of the CO filter system 10 is shown in FIG. 3 by way of block diagram and is generally denoted by reference numeral 10'. As shown in FIG. 3, the CO filter system 10' includes a ring LPF 34 having power inductors L1, L2, and a high voltage capacitor C1, which in combination form a LPF with a very low cutoff frequency (see transfer function H(f) 52 in FIG. 5) of approximately 100 Hz for attenuating transients and harmonics that would otherwise be unattenuated from the telephone switch 14. Diode pairs D1, D2, and D3, D4 readily conduct during alternate phases of the power ring cycle, but do not conduct appreciably for small signals. Thus, the capacitor C1 essentially has no effect upon small signals, such as with an analog voice signal communicated from connection 16 to 18 or vice versa. Switches S1 and S2 bypass respective inductors L1 and L2. The switches S1 and S2 are controlled by the current detector 31 and can be any suitable switching mechanism. In the preferred embodiment, the switches S1, S2 are part of a commercially available solid state relay (SSR), for example but not limited to, a Model CP Clare LAA-X-10054 SSR, as will be further described hereinafter. The switches S1, S2 are closed when an analog voice signal is present on the subscriber loop 13 so that the analog voice signals are essentially not passed through the ring LPF 34 and are generally unaffected by the ring LPF 34. The switches S1 and S2 are maintained open when the telephone 25 (FIG. 1) is on hook, and particularly, when a ring signal is received on connection 16 from the telephone switch 14 (FIG. 1).

The caller ID bypass 41 can be implemented with any suitable circuitry for achieving the purpose of passing the caller ID signal without substantial attenuation. In this first embodiment, the caller ID bypass 41 is implemented simply via resistors R1, R2 with appropriate resistance values.

The current detector 31 employs commercially available SSRs, for example but not limited to, Model CP Clare LAA-X-10054 SSR, to control the switching operations in the ring LPF 34, i.e., actuation of the switches S1, S2. As shown in FIG. 3, optocoupler diode pairs D5, D6 and switch S1 form one SSR, and optocoupler diodes D7, D8 and switch S2 form another SSR. Optocoupler diode pairs D5, D6 and D7, D8 actuate switches S1, S2, respectively. Specifically, either diode D5 or D6 actuates switch S1 and either diode D7 or D8 actuates switch S2, depending upon the polarity of the DC current along the connection between 18a and 16a. Actuation is based upon the presence of at least five milliamperes (mA) of DC current through emitting diodes D5, D7 or D6, D8, depending on line current polarity. Ballast resistors R3, R4 serve to balance the current through the two respective connecting diodes D5, D6 and D7, D8, despite variations in bias voltages with current, to prevent current hogging. Capacitors C2, C3, having reverse polarity as shown in FIG. 3 to provide a non-polarized capacitance, shunt AC power ring signals around the optocoupler diodes D5–D8, such that the power ring signals (without significant DC current) will not close switches S1, S2. A resistor R5 is designed to discharge the capacitors C2, C3 upon transition of the telephone 25 to on-hook status. Note that the SSRs (D5, D6, S1, and D7, D8, S2) may be replaced with other switching mechanisms, for example but not limited to, mechanical or electromechanical relays. If polarized mechanical relays are used, then a bridge rectifier may be employed to rectify the line current to one polarity for proper polarized relay operation, as is known in the art.

The voice LPF 38 can be implemented with any suitable LPF, conventional or custom made, for voice (POTS) band communications preferably within the range of 0–4 KHz. Many configurations are known in the art. In this first embodiment 10' of the CO filter system 10, the voice LPF 38 is designed as a degenerated third-order elliptic-function (LPF; see transfer function H(f) 51 in FIG. 5). Generally, the voice LPF is designed to pass an analog voice (POTS) signal and attenuate a digital data (DSL) signal. The combination of resistors R6–R9, capacitors C4, C5, C6, C7, and coupled inductors L3, L4 modify the input impedance, as seen from the line, as required. Further, inductors L3, L4 are coupled with a coupling factor M1 of about 1.0 in the preferred embodiment. Almost needless to say, other coupling factors are possible.

The operation of the first embodiment 10' of the CO filter system 10 will now be described. When the telephone 25 (FIG. 1) is on-hook and awaiting a telephone ring, the switches S1, S2 are in an open position, as illustrated in FIG. 3. When the CO filter system 10' receives a ring signal from the telephone switch 14 (FIG. 1) along connection 16, the diodes D1, D2 and diodes D3, D4 conduct on alternating polarities of the ring signal, thereby causing the ring signal to be exposed to the capacitor C1 as well as inductors L1, L2. The combination of L1, L2, C1 imposes the first transfer function upon the ring signal, which suppresses transients and harmonics that would otherwise be generated by the ring signal upon the subscriber loop 13 (FIG. 1). Next, the filtered ring signal passes through the current detector 31 and the LPF 38, substantially unaffected, and ultimately to the telephone 25 (FIG. 1).

When the telephone 25 is off-hook, then a DC current appears on the subscriber loop 13 and connection 18a. The presence of a DC current indicates that a POTS channel now exists on the subscriber loop 13. In this event, switches S1 and S2 are closed by either diodes D5, D7 or D6, D8, respectively, so that the voice signal is passed around respective inductors L1, L2. Moreover, diodes D1, D2 and D3, D4 isolate the small analog voice signal from and prevent the analog voice signal from being affected or attenuated by the capacitor C1. The analog voice signal is, however, filtered above 4 KHz by the voice LPF 38 so that DSL signals are significantly attenuated.

EXAMPLE

The following is a table of circuit component values that are preferred in the first embodiment 10' (FIG. 3) of the CO filter system 10. This set of values is intended as a nonlimiting example and, as will be appreciated by those skilled in the art, other values as well as circuit variations resulting from use of different values are possible.

| Element | Value |
| --- | --- |
| L1 | 0.5 H |
| L2 | 0.5 H |
| L3 | 4 mH |
| L4 | 4 mH |
| C1 | 2 μF |
| C2 | 1 mF |
| C3 | 1 mF |
| C4 | 22 nF |
| C5 | 22 nF |
| D1–D4 | Model 1N4001 |

-continued

| Element | Value |
| --- | --- |
| D5–D8 (S1–S2) | Part of Model LAA-X10054 SSR |
| R1 | 1500 ohm |
| R2 | 1500 ohm |
| R3 | 10 ohm |
| R4 | 10 ohm |
| R5 | 1 Kohm |
| R6 | 1000 ohm |
| R7 | 1000 ohm |
| R8 | 301 ohm |
| R9 | 301 ohm |

Second Embodiment

Figure 4:
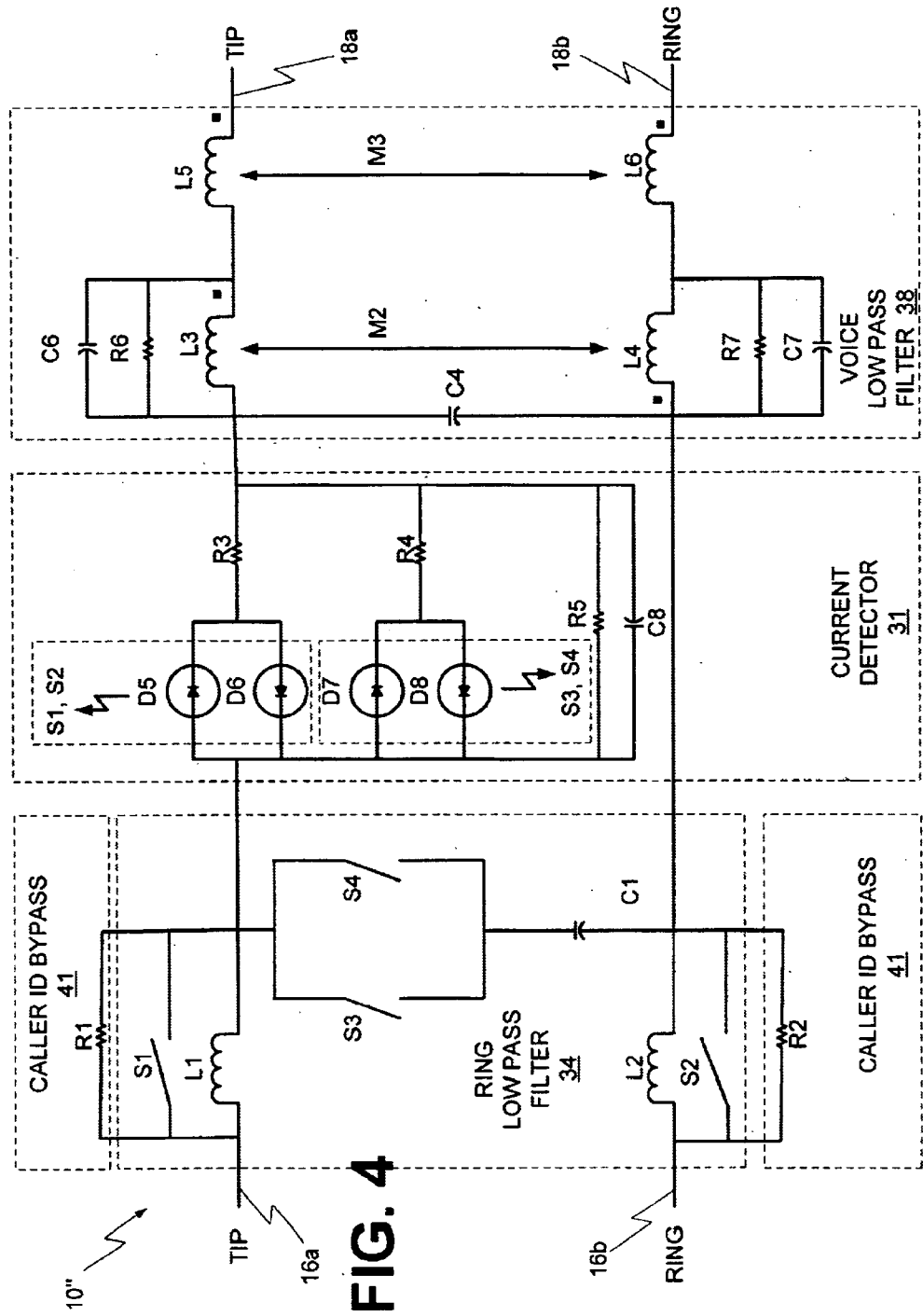
FIG. 4 is a second embodiment of the CO filter system of FIGS. 1–3.

A second embodiment of the CO filter system 10 is shown in FIG. 4 and is generally denoted by reference number 10". At present, the first embodiment 10' is preferred over the second embodiment 10" because the first embodiment 10' is less expensive to manufacture as compared to the second embodiment 10".

As shown in FIG. 4, the CO filter system 10" includes a ring LPF 34 having power inductors L1, L2, and a high voltage capacitor C1, which in combination form an LPF with a cutoff frequency of approximately 100 Hz for attenuating transients and harmonics that would otherwise be produced from the telephone switch 14. In contrast to the first embodiment 10', in this second embodiment 10", optocoupler diodes D5, D6 and D7, D8 control and actuate switches S1, S2 and S3, S4, respectively. Preferably, the switches S1, S2 are part of a commercially available SSR along with and controlled by diodes D5, D6, and are normally open (no). The switches S3, S4 are part of another commercially available SSR along with and controlled by diodes D7, D8 and are normally closed (nc).

Switches S3, S4 are controlled by diodes D7, D8 to close and conduct during a power ring cycle, and to open and not conduct appreciably when the telephone 25 is off-hook. Thus, the capacitor C1 essentially has no effect upon small signals, such as with an analog voice signal communicated from connection 16 to 18 or vice versa. Note that two switches S3, S4 are utilized, instead of just one switch S3 or S4, because the configuration minimizes resistance.

Switches S1, S2 bypass respective inductors L1, L2. The switches S1, S2 are controlled by diodes D5, D6 and can be any suitable switching mechanism. The switches S1, S2 are controlled to close and conduct when telephone 25 is off-hook so that the analog voice signals are essentially attenuated by the ring LPF 34 and are generally unaffected by the ring LPF 34. The switches S1, S2 are maintained open when the telephone 25 (FIG. 1) is on hook, and particularly, when a ring signal is received on connection 16 from the telephone switch 14 (FIG. 1).

The caller ID bypass 41 can be implemented with any suitable circuitry for achieving the purpose of passing the caller ID signal without substantial attenuation. In this first embodiment, the caller ID bypass 41 is implemented simply via resistors R1, R2 with appropriate resistance values.

The current detector 31 employs commercially available SSRs to control actuation of the switches S1–S4. As shown in FIG. 4, optocoupler diode pairs D5, D6 and switches S1, S2 form one SSR, and optocoupler diodes D7, D8 and switches S3, S4 form another SSR. Specifically, at any given time, either diode D5 or D6 actuates both switches S1 and S2 and either diode D7 or D8 actuates switches S3 and S4, depending upon the polarity of the DC current along the connection between nodes 18a and 16a. Actuation is based upon the presence of at least five milliamperes (mA) of DC current through emitting diodes D5, D7 or D6, D8, depending on line current polarity. Ballast resistors R3, R4 serve to balance the current through the two respective connecting diodes D5, D6 and D7, D8, despite variations in bias voltages with current, to prevent current hogging. Capacitor C8, which is nonpolar in this embodiment, shunt ring signals around the optocoupler diodes D5–D8, such that the ring signals (without significant DC current) will not close switches S1, S2 and will not open switches S3, S4. Resistor R5 is designed to discharge the capacitor C8 upon transition of the telephone 25 to on-hook status. Note that the SSRs (D5, D6, S1, S2 and D7, D8, S3, S4) may be replaced with other switching mechanisms, for example but not limited to, mechanical or electromechanical relays. If polarized mechanical relays are used, then a bridge rectifier may be employed to rectify the line current to one polarity for proper polarized relay operation, as is known in the art.

The voice LPF 38 can be implemented with any suitable LPF, conventional or custom made, for voice (POTS) band communications preferably within the range of 0–4 KHz. Many configurations are known in the art. In this second embodiment 10" of the CO filter system 10, the voice LPF 38 is designed to pass an analog voice (POTS) signal and attenuate a digital data (DSL) signal. The combination of resistors R6, R7, capacitors C4, C5, C6, C7, and inductors L3–L6 modify the input impedance, as seen from the line, as required. Further, inductors L3, L4 are coupled with a coupling factor M2 of about 1.0 in the preferred embodiment, and inductors L5, L6 are coupled with a coupling factor M3 of about 1.0 in the preferred embodiment. Inductors L5, L6 form a common mode choke to improve the common mode filtering in voice LPF 38.

The operation of the second embodiment 10" of the CO filter system 10 will now be described. When the telephone 25 (FIG. 1) is on-hook and awaiting a telephone ring, the switches S1, S2 are in an open position, while the switches S3, S4 are in a closed position. When the CO filter system 10' receives a ring signal from the telephone switch 14 (FIG. 1) along connection 16 (16a, 16b), the diodes D7, D8 do not conduct on alternating polarities of the ring signal, causing switches S3, S4 to both remain closed and the diodes D5, D6 do not conduct on alternating polarities of the ring signal, causing switches S1, S2 to remain open. Thus, the ring signal is exposed to the capacitor C1 as well as inductors L1, L2. The combination of L1, L2, C1 imposes the first transfer function upon the ring signal, which suppresses transients and harmonics that would otherwise be generated by the telephone switch 14 on subscriber loop 13 (FIG. 1). Next, the filtered ring signal passes through the current detector 31 and the LPF 38, substantially unaffected, and ultimately to the telephone 25 (FIG. 1).

When the telephone 25 is off-hook, then a DC current appears on the subscriber loop 13 and connection 18a. The presence of a DC current indicates that a POTS channel now exists on the subscriber loop 13. In this event, switches S1, S2 are both closed by either diode D5, D6, at any given time during the analog voice session, so that the voice signal is passed around respective inductors L1, L2. Moreover, switches S3, S4 are both opened by either diode D7 or D8 at any given time during the analog voice session, to isolate the analog voice signal from and prevent the analog voice signal from being affected or attenuated by the capacitor C1. The analog voice signal is, however, filtered beyond 4 KHz by the voice LPF 38 so that DSL signals are significantly attenuated.

Example

The following is a table of circuit component values that are preferred in the second embodiment 10" (FIG. 4) of the CO filter system 10. This set of values is intended as a nonlimiting example and, as will be appreciated by those skilled in the art, other values as well as circuit variations resulting from use of different values are possible.

| Element | Value |
| --- | --- |
| L1 | 0.5 H |
| L2 | 0.5 H |
| L3 | 4 mH |
| L4 | 4 mH |
| C1 | 2 $\mu$F |
| C4 | 22 nF |
| C6 | 3.3 nF |
| C7 | 3.3 nF |
| C8 | 500 $\mu$F |
| R1 | 1500 ohm |
| R2 | 1500 ohm |
| R3 | 10 ohm |
| R4 | 10 ohm |
| R5 | 1000 ohm |
| R6 | 1000 ohm |
| R7 | 1000 ohm |

Figure 5:
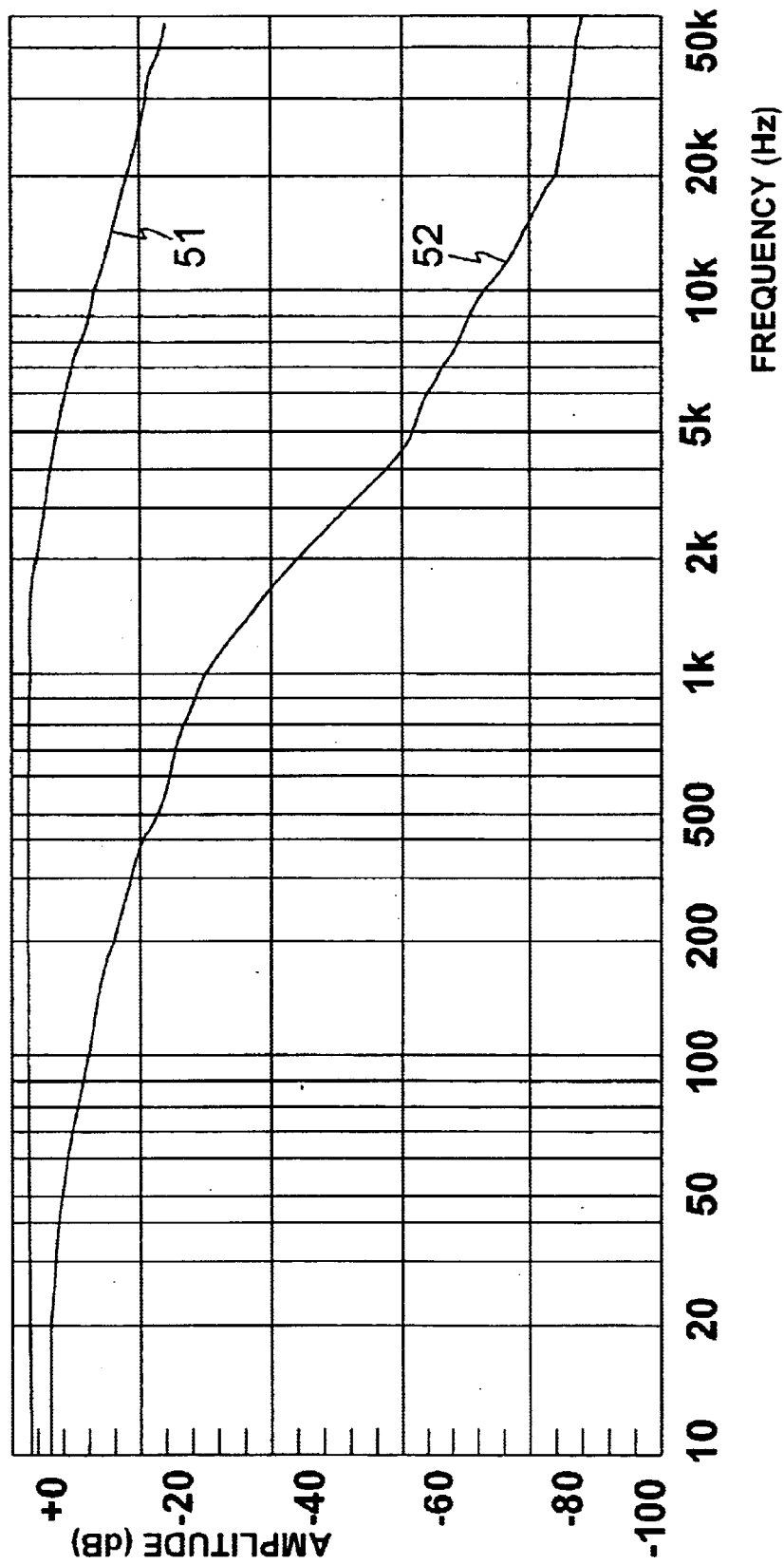
FIG. 5 is a graph (amplitude vs. log of frequency) showing first and second transfer functions that are exhibited by the first embodiment of the CO filter system of FIG. 3, the first exhibited when there is no ring signal and the second exhibited when there is a ring signal.

FIG. 5 is a graph of signal amplitude versus the logarithm (log) of frequency showing the first and second transfer functions H(f) (also known as, signal response) denoted by reference numbers 51, 52, respectively, associated with the first embodiment of the CO filter system 10. The transfer functions associated with the second embodiment 10" are similar and are not shown for simplicity.

Referring to FIG. 5, when the first transfer function 51 is employed by the CO filter system 10', i.e., when the telephone 25 is off-hook, then there is a subscriber loop current of at least 5 mA, and the diodes D1–D4 are not conducting. As result, the small-signal voice LPF 38 is implemented by the CO filter system 10', and the voice spectrum from approximately 0 to 4 KHz is not substantially attenuated or adversely affected. When there is generally no subscriber loop DC current, i.e., when the telephone 25 is on-hook, and when a ring signal is produced by the telephone switch 14, then the diodes D1–D4 are conducting during the majority of the ring signal, and the second transfer function 52 is implemented by the ring LPF 34. As is illustrated in FIG. 5, the second transfer function would be inappropriate for the voice band as it would undesirably attenuate it, but appropriately attenuates large-signal transients and harmonics that would otherwise be produced by the telephone switch 14 along the subscriber loop 13 and undesirably imposed upon the one or more digital data channels on loop 13. The ring LPF 34 of filter system 10" is more effective than the ring LPF 34 of filter system 10' in attenuating both large and small signal transients and harmonics produced by the telephone switch 14.

It should be emphasized that the above-described embodiments of the present invention, particularly, any "preferred" embodiments or configurations, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention.

What is claimed is:

1. A filter system for connecting between a central office telephone switch and a telephone connection that can communicate voice and digital data channels using signals communicated between a central office and a customer premises, the system for suppressing transients and harmonics on the connection caused by a ring signal generated by the telephone switch in order to minimize adverse effects on the digital data channel on the connection, said ring signal composed of an on period and an off period, the filter system comprising:

a first filter designed to implement a first low pass filter function to attenuate frequencies higher than said ring signal;

a second filter designed to implement a second low pass filter function to attenuate frequencies higher than a voice channel; and a filter selector designed to impose said first filter on said signals whenever a telephone connected to said telephone connection is on-hook and said ring signal is present, and to impose said second filter on said signals whenever said telephone is off-hook and when said telephone is on-hook and said ring signal is absent, where the filter selector is line-powered, and where said first low pass filter function is applied for the duration of said on period of said ring signal.

2. The system of claim 1, wherein said first filter function has a linear response.

3. The system of claim 1, further comprising a circuit path permitting a caller identification signal to pass therethrough.

4. The system of claim 1, further comprising:

a first port connected to the central office telephone switch, said switch providing said ring signal to said system, and establishing said analog voice channel through said system; and a second port connected to said telephone connection; and a digital modem connected to said second port and said telephone connection and establishing at least one digital data channel on said telephone connection.

5. The filter system of claim 1, where filter selector comprises:

a first optocoupler diode pair;

a second optocoupler diode pair in parallel with said first optocoupler diode pair;

a capacitor in parallel with said first and second optocoupler diode pairs; and a resistor in parallel with said first and second optocoupler diode pairs.

6. The filter system of claim 5, wherein the first filter comprises:

a first switch activated by said first optocoupler diode pair;

a second switch activated by said second optocoupler diode pair;

a first inductor in parallel with said first switch;

a second inductor in parallel with said second switch;

a first diode pair configured to conduct during a first phase of the ring signal;

a second diode pair in parallel with said first pair of diodes and configured to conduct during a second phase of the ring signal; and a capacitor placed in series with the first and second diode pairs.

7. A method for suppressing noise on a telephone connection that communicates analog and digital data channels using signals communicated between a central office and a customer premises, said noise caused by a ring signal generated by a telephone switch, in order to reduce adverse effects on at least one of the digital data channels, said ring signal composed of an on period and an off period, the filter system comprising:

imposing a first transfer function on said signals, said first transfer function configured to attenuate frequencies higher than said ring signal;

imposing a second transfer function on said signals, said second transfer function configured to permit passage of an analog voice channel, while attenuating frequencies higher than said analog voice channel; and switching between said first and second transfer functions to impose said first transfer function on said signals whenever a telephone connected to said telephone connection is on-hook and said ring signal is present and to impose said second transfer function on said signals whenever said telephone is off-hook and when said telephone is on-hook and said ring signal is absent, such that said switching draws power from said telephone connection, such that said first low pass filter function is applied for the duration of said on period of said ring signal.

8. The method of claim 7, wherein said first transfer function has a linear response.

9. The method of claim 7, further comprising the step of permitting a caller identification signal to pass without substantial attenuation by said first and second transfer functions.

10. The method of claim 7, wherein said telephone connection is a two-wire copper pair.

11. The method of claim 7, further comprising the steps of:

providing said ring signal from a central office telephone switch; said switch establishing said analog voice channel on said connection; and establishing at least one digital data channel on said telephone connection with a digital modem.

12. The method of claim 7, where said noise is comprised of transients.

13. The method of claim 7, where said noise is comprised of harmonics.

14. A filter system for connecting between a central office telephone switch and a telephone connection that can communicate voice and digital data channels using signals communicated between a central office and a customer premises, the system for suppressing transients and harmonics on the connection caused by a ring signal generated by the telephone switch in order to minimize adverse effects on the digital data channel on the connection, said ring signal composed of an on period and an off period, the filter system comprising:

a first filter designed to implement a first low pass filter function to attenuate frequencies higher than said ring signal;

a second filter designed to implement a second low pass filter function to attenuate frequencies higher than a voice channel; and a filter selector designed to impose said first filter on said signals whenever a telephone connected to said telephone connection is on-hook and said ring signal is present, and to impose said second filter on said signals whenever said telephone is off-hook and when said telephone is on-hook and said ring signal is absent and where said first low pass filter function is applied for the duration of said on period of said ring signal, comprising:
a first optocoupler diode pair;
a second optocoupler diode pair in parallel with said first optocoupler diode pair;
a capacitor in parallel with said first and second optocoupler diode pairs; and
a resistor in parallel with said first and second optocoupler diode pairs, where the filter selector is line-powered.

15. The filter system of claim 14, wherein the first filter comprises:
a first switch activated by said first optocoupler diode pair;
a second switch activated by said second optocoupler diode pair;
a first inductor in parallel with said first switch;
a second inductor in parallel with said second switch;
a first diode pair configured to conduct during a first phase of the ring signal;
a second diode pair in parallel with said first diode pair and configured to conduct during a second phase of the ring signal; and
a capacitor placed in series with the first and second diode pairs.

* * * * *